(12) United States Patent
Chen et al.

(10) Patent No.: US 8,379,415 B2
(45) Date of Patent: Feb. 19, 2013

(54) SYSTEMS AND METHODS FOR REDUCING EMI IN SWITCH MODE CONVERTER SYSTEMS

(75) Inventors: Zhiliang Chen, Shanghai (CN); Xiuhong Zhang, Shanghai (CN); Jun Ye, Shanghai (CN); Shifeng Zhao, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/350,059

(22) Filed: Jan. 13, 2012

(65) Prior Publication Data

US 2012/0300507 A1 Nov. 29, 2012

Related U.S. Application Data

(63) Continuation of application No. 12/055,577, filed on Mar. 26, 2008, now Pat. No. 8,125,802.

(60) Provisional application No. 60/908,156, filed on Mar. 26, 2007.

(51) Int. Cl.
*H02M 3/335* (2006.01)
*H02M 3/156* (2006.01)

(52) U.S. Cl. .................. 363/21.16; 363/21.08; 323/251

(58) Field of Classification Search .................. 323/253, 323/254, 251, 267, 332, 334, 335; 363/20, 363/21.01, 21.04, 21.07, 21.08, 21.14, 21.15, 363/21.16, 39, 40, 65, 71; 307/83; 336/84 C, 336/185

See application file for complete search history.

(56) References Cited

U.S. PATENT DOCUMENTS

| | | | | |
|---|---|---|---|---|
| 5,615,091 A | * | 3/1997 | Palatnik | 363/17 |
| 7,164,338 B2 | * | 1/2007 | Odell et al. | 336/181 |
| 7,482,905 B2 | * | 1/2009 | Polivka et al. | 336/200 |
| 7,619,903 B2 | * | 11/2009 | Choi | 363/20 |
| 2002/0097130 A1 | * | 7/2002 | Vinciarelli et al. | 336/212 |
| 2008/0018425 A1 | * | 1/2008 | Lu et al. | 336/84 |

* cited by examiner

*Primary Examiner* — Adolf Berhane
*Assistant Examiner* — Jeffrey Gblende
(74) *Attorney, Agent, or Firm* — Jones Day

(57) ABSTRACT

Switch mode power converter system and method thereof. The system includes one or more isolation boxes including at least a first isolation box, an input primary winding for receiving an input signal for the switch mode power converter system, and an output secondary winding for generating an output signal for the switch mode power converter system. The switch mode power converter system is configured to convert the input signal to the output signal. One of the input primary winding and the output secondary winding is substantially enclosed in the first isolation box, and the other of the input primary winding and the output secondary winding is not enclosed in the first isolation box. The first isolation box is conductively connected to a constant-voltage source.

18 Claims, 8 Drawing Sheets

SYSTEMS AND METHODS FOR REDUCING EMI IN SWITCH MODE CONVERTER SYSTEMS

1. CROSS-REFERENCES TO RELATED APPLICATIONS

This application is a continuation of U.S. patent application Ser. No. 12/055,577, filed Mar. 26, 2008, which claims priority to U.S. Provisional No. 60/908,156, filed Mar. 26, 2007, both applications being commonly assigned and incorporated by reference herein for all purposes.

2. BACKGROUND OF THE INVENTION

The present invention is directed to integrated circuits. More particularly, the invention provides systems and methods for reducing electromagnetic interference (EMI). Merely by way of example, the invention has been applied to a switch mode power converter. But it would be recognized that the invention has a much broader range of applicability.

Switch mode power converters include at least flyback power converters and forward power converters. The flyback power converters often use primary-side sensing and regulation and can provide cost-effective solutions for low power applications.

FIG. 1 is a simplified conventional flyback power converter system. For example, the flyback power converter system 100 uses a primary-side sensing and regulation scheme. In another example, the primary circuit of the system 100 includes a primary switch that is controlled through a feedback control signal VFB. In yet another example, the primary circuit is also called the input circuit.

The system 100 also includes a transformer that includes an input winding 110, an output winding 120, a feedback sensing winding 130, and an IC VDD supply winding 140. For example, the feedback sensing winding 130 and the IC VDD supply winding 140 are two windings. In another example, the feedback sensing winding 130 and the IC VDD supply winding 140 are one same winding.

For example, the input winding 110 is on the primary side, and the windings 120, 130, and 140 are on the secondary side. For each of these four windings, a winding dot polarity is used to indicate the phase relationship of the winding voltages. For example, during voltage transitions across the windings, the dot ends of the windings are in phase. In another example, through the feedback sensing winding 130, the feedback control signal VFB is a replica of an output voltage Vo. Additionally, the system 100 may include a clamp circuit, which may be a RCD snubber. In yet another example, the system 100 includes a switch 150.

During the normal operation of the flyback power converter system 100, the voltages across both the input winding 110 and the output winding 120 change accordingly. These changes often generate displacement currents in various parasitic capacitors. These displacement currents usually have a common-mode (CM) component and a differential-mode (DM) component. The DM component often can be filtered by, for example, a front-end filter. But the CM component usually cannot be filtered effectively, and can thus cause significant EMI issues as measured by, for example, a Line Input Stabilization Network (LISN).

FIG. 2 shows simplified conventional parasitic capacitors that exist between an input winding and an output winding, and between a transformer core and an electrical earth. For example, FIG. 2 shows simplified conventional parasitic capacitors that exist in the system 100. In another example, the transformer core is a ferrite core used in the transformer construction to provide a low reluctance path for the magnetic flux coupling the input and output windings of the transformer.

As shown in FIG. 2, there may be common-mode and differential-mode displacement currents. The Y-capacitor Cy often is used in a switch mode power converter to reduce the common-mode EMI. For example, the Y-capacitor Cy provides a low-impedance path for the displacement current that flows between the input circuit and the output circuit of a flyback power converter and returns to its source without flowing through the electrical earth. The current in the Y-capacitor Cy is not detected by the LISN; hence the use of a Y-capacitor can reduce the common-mode EMI.

But the use of a Y-capacitor can create a cost issue for certain low-power AC/DC systems. Without such Y-capacitor, these low-power systems may suffer from serious EMI problems. For example, in the low-power systems, displacement currents are generated by the operation of switch mode power converters. These displacement currents often flow to the electrical earth and cause EMI to other equipment. Hence, it is desirable to keep these currents below limits, such as ones set by various regulatory agencies. In more detail, the switch mode power converters include transformers, which can generate at least two displacement currents that flow to the electrical earth. One displacement current flows from the core of a transformer to the electrical earth. For example, this current is generated by voltage transitions on the transformer windings that couple to the core of the transformer by parasitic capacitors, and hence flows through free space between the core of the transformer and the electrical earth. In contrast, the other displacement current is generated by differential voltages between the primary winding and the secondary winding of the transformer. For example, the differential voltages generate the displacement current in the inter-winding capacitors, and this displacement current returns to its source through parallel paths.

To reduce displacement currents, several conventional methods and apparatuses have been developed. Some of these methods and apparatuses use the conventional techniques of winding cancellation or winding balancing in an energy transfer element, such as a transformer. For example, the techniques of winding cancellation or winding balancing can reduce the displacement current between the coupling of the input winding and the output winding. Specifically, a cancellation winding is coupled to the input ground, and is physically positioned within the transformer and close to the output winding. Therefore, the cancellation winding can generate the displacement current through inter-winding parasitic capacitors. If the displacement current, which flows from the cancellation winding to the output winding, exactly matches the displacement current that flows from the output winding to the input ground through an electrically conductive shield, such as copper, the net displacement current is zero.

Additionally, the conventional techniques of winding cancellation can also be used to reduce the displacement current flowing between the primary winding and the transformer core that often is made of one or more ferrite materials. The net effect of adding cancellation winding is that the influence of the electrostatic field produced by other windings in the transformer relative to the transformer core can be cancelled by the electrostatic field created by the cancellation winding. Consequently the displacement current between transformer windings and transformer core can be reduced theoretically to zero if the electrostatic fields perfectly cancel.

The conventional techniques of winding cancellation or winding balancing may require a large number of winding turns. Hence it is highly desirable to improve techniques for reducing electromagnetic interference.

3. BRIEF SUMMARY OF THE INVENTION

The present invention is directed to integrated circuits. More particularly, the invention provides systems and methods for reducing electromagnetic interference (EMI). Merely by way of example, the invention has been applied to a switch mode power converter. But it would be recognized that the invention has a much broader range of applicability.

According to one embodiment, a switch mode power converter system includes one or more isolation boxes including at least a first isolation box, an input primary winding for receiving an input signal for the switch mode power converter system, and an output secondary winding for generating an output signal for the switch mode power converter system. The switch mode power converter system is configured to convert the input signal to the output signal. One of the input primary winding and the output secondary winding is substantially enclosed in the first isolation box, and the other of the input primary winding and the output secondary winding is not enclosed in the first isolation box. The first isolation box is conductively connected to a constant-voltage source.

According to another embodiment, a switch mode power converter system includes a first isolation box, a second isolation box, an input primary winding for receiving an input signal for the switch mode power converter system, and an output secondary winding for generating an output signal for the switch mode power converter system. Additionally, the system includes a feedback winding for generating a feedback signal, and a voltage supply winding for generating a voltage. The switch mode power converter system is configured to convert the input signal to the output signal. At least the input primary winding is substantially enclosed in the first isolation box, and at least the output secondary winding and the feedback winding are substantially enclosed in the second isolation box. The first isolation box and the second isolation box are conductively connected to a constant-voltage source.

According to yet another embodiment, a switch mode power converter system includes an isolation box, and a first plurality of windings including an input primary winding and a voltage supply winding. The input primary winding is for receiving an input signal for the switch mode power converter system, and the voltage supply winding is for generating a voltage. Additionally, the system includes a second plurality of windings including an output secondary winding and a feedback winding. The output secondary winding is for generating an output signal for the switch mode power converter system, and the feedback winding is for generating a feedback signal. The switch mode power converter system is configured to convert the input signal to the output signal. One plurality of the first plurality of windings and the second plurality of windings is substantially enclosed in the first isolation box, and the other plurality of the first plurality of windings and the second plurality of windings is not enclosed in the first isolation box. The first isolation box is conductively connected to a constant-voltage source.

Many benefits are achieved by way of the present invention over conventional techniques. Certain embodiments of the present invention provide techniques for reducing EMI in low-power switch mode power supplies. For example, a technique is provided to reduce EMI that is generated by an energy transfer element, such as a transformer, which is used in a No-Y flyback switch mode power converter system. In another example, a technique is provided to reduce EMI that is generated by an energy transfer element, which is used in a forward power converter system. Some embodiments of the present invention use one or more isolation boxes to reduce EMI in various applications, such as low-power applications.

According to certain embodiments of the present invention, a switch mode power converter system uses one or more isolation boxes. The one or more isolation boxes can reduce or minimize the coupling of parasitic capacitors that significantly affects EMI. Additionally, the one or more isolation boxes can reduce or prevent the EMI emission by enclosing noisy devices in the one or more isolation boxes. For example, the one or more isolation boxes are tied to the electrical earth. In another example, noisy and coupling windings that contribute significantly to the displacement current and the EMI emission can be separated by using the one or more isolation boxes. According to some embodiments of the present invention, a switch mode power converter system uses two or more isolation boxes so that EMI can be reduced to an even lower level than a system using only one isolation box.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 5A:
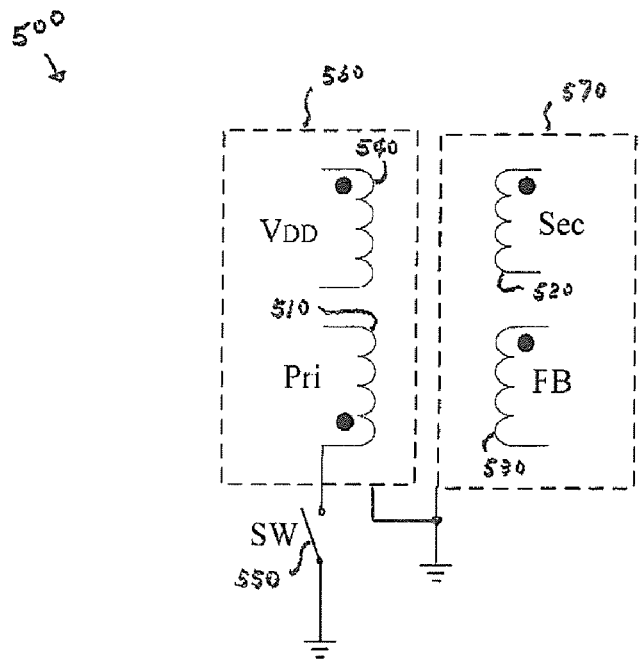
Figure 6A:
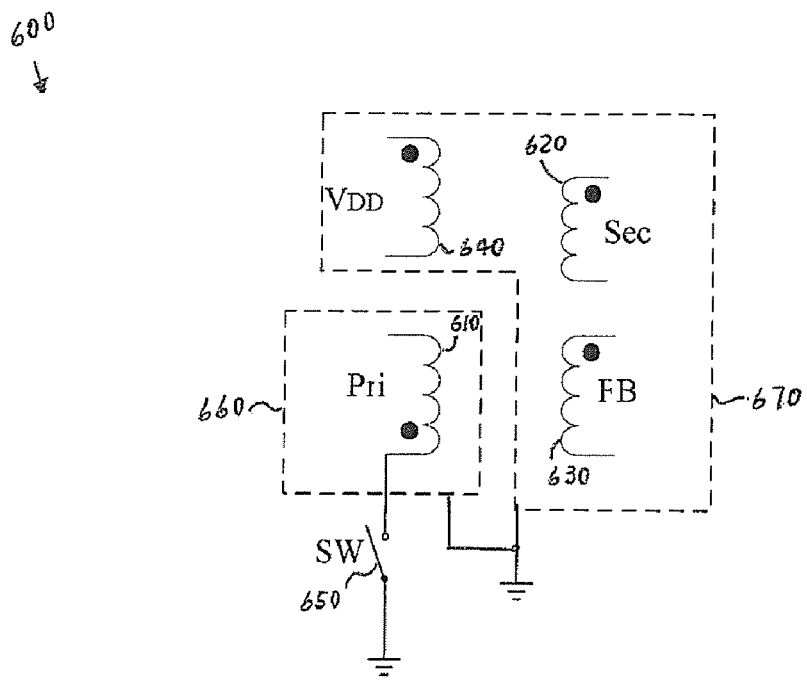
Figure 7A:
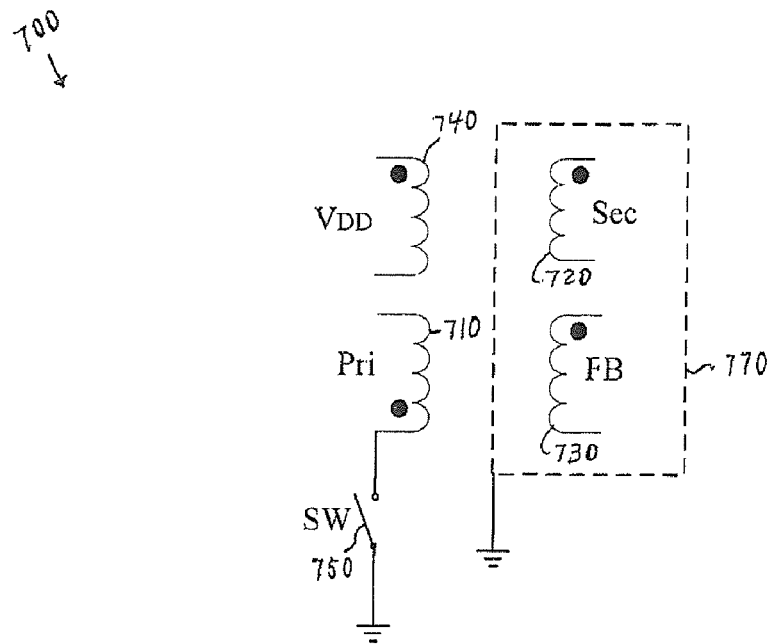
Figure 8A:
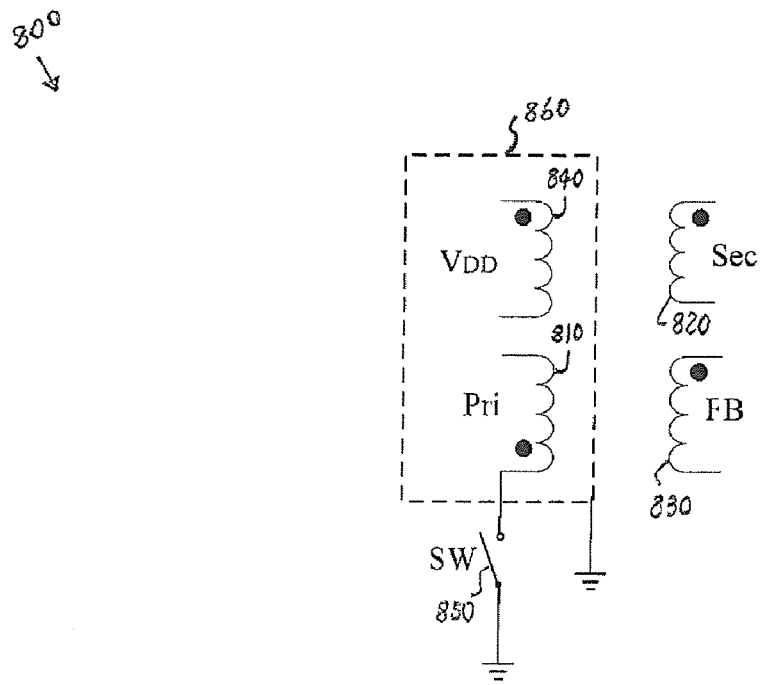

FIGS. 5(a) and (b) show a simplified flyback power converter system according to an embodiment of the present invention;

FIGS. 6(a) and (b) show a simplified flyback power converter system according to another embodiment of the present invention;

FIGS. 7(a) and (b) show a simplified flyback power converter system according to yet another embodiment of the present invention;

FIGS. 8(a) and (b) show a simplified flyback power converter system according to yet another embodiment of the present invention.

5. DETAILED DESCRIPTION OF THE INVENTION

The present invention is directed to integrated circuits. More particularly, the invention provides systems and methods for reducing electromagnetic interference (EMI). Merely by way of example, the invention has been applied to a switch mode power converter. But it would be recognized that the invention has a much broader range of applicability.

The conventional techniques have significant drawbacks. For example, the techniques of winding cancellation or winding balancing may require a large number of winding turns. Specifically, the number of turns for the cancellation winding often needs to be approximately double the number of turns for the output winding if the physical separation between the output winding and the shield is equal to the physical separation between the cancellation winding and the output winding. Such preference for the number of turns can be explained, for example, by the circuit design that the dot polarity for both the output winding and the cancellation winding is the same. If the number of turns for the cancellation winding is equal to the number of turns for the output winding turn, these windings can have the voltage transitions that are the same in magnitude; hence approximately, zero displacement current would flow between the cancellation winding and the output winding. But the displacement current between the cancellation winding and the output winding should be equal to the displacement current that flows between the output winding and the shield. Hence the number of turns for the cancellation winding often needs to be roughly double the number of turns for the output windings.

As another example, the techniques of winding cancellation or winding balancing relies on the matching of parasitic capacitors for actual EMI reduction. Such reliance can complicate the transformer design. For example, the parasitic capacitance between the output winding and the cancellation winding often needs to equal the parasitic capacitance between the output winding and the shield, but in a mass production process, such matching in parasitic capacitance often is difficult to achieve and results in significant manufacturability issues.

Figure 3:
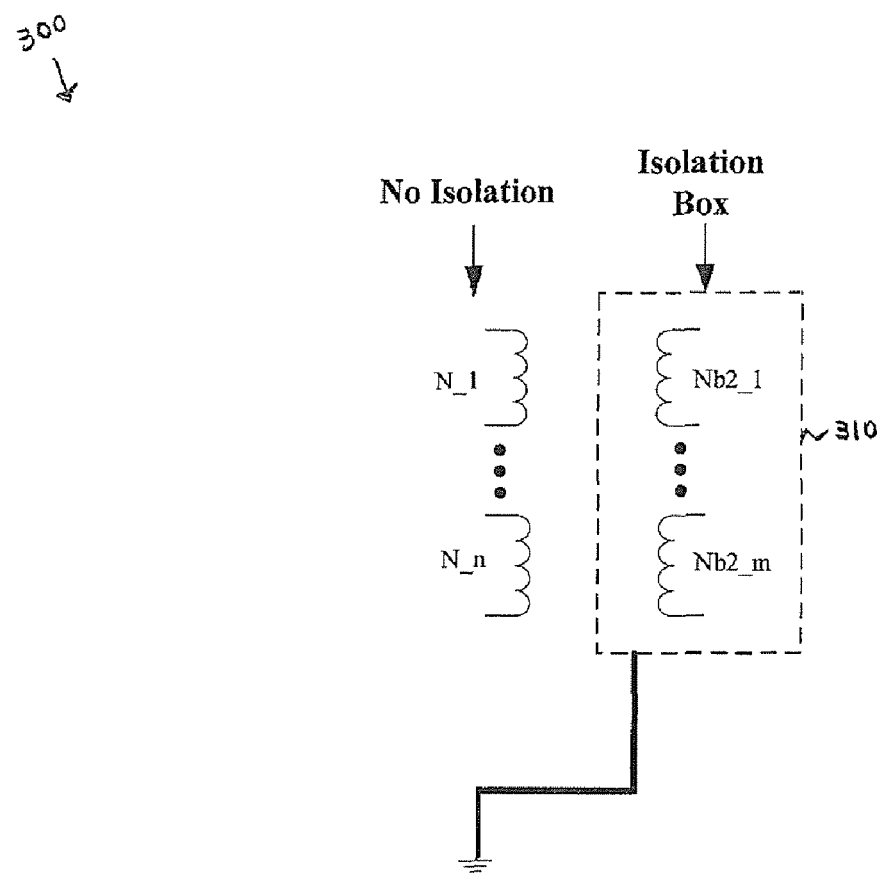
FIG. 3 is a simplified system for reducing electromagnetic interference according to an embodiment of the present invention.

FIG. 3 is a simplified system for reducing electromagnetic interference according to an embodiment of the present invention. This diagram is merely an example, which should not unduly limit the scope of the claims. One of ordinary skill in the art would recognize many variations, alternatives, and modifications. A system 300 includes at least two groups of windings. One of these two groups includes windings N_1, ..., N_n, where n is a positive integer, and this group is not enclosed within an isolation box. The other one of the these two groups includes windings Nb2_1, ..., Nb2_m, where m is a positive integer, and this group is substantially or completely enclosed by an isolation box 310.

According to one embodiment, the isolation box, such as the isolation box 310, includes one or more metal boards and/or one or more winding turns. For example, the one or more metal boards are one or more metal panels. In another example, the one or more metal boards and/or one or more winding turns are conductively connected to each other, directly or indirectly. In one embodiment, the isolation box is biased to a constant voltage level, such as a ground voltage level. In another embodiment, the one or more metal boards are made of copper, and/or the one or more winding turns are made of copper.

Figure 4:
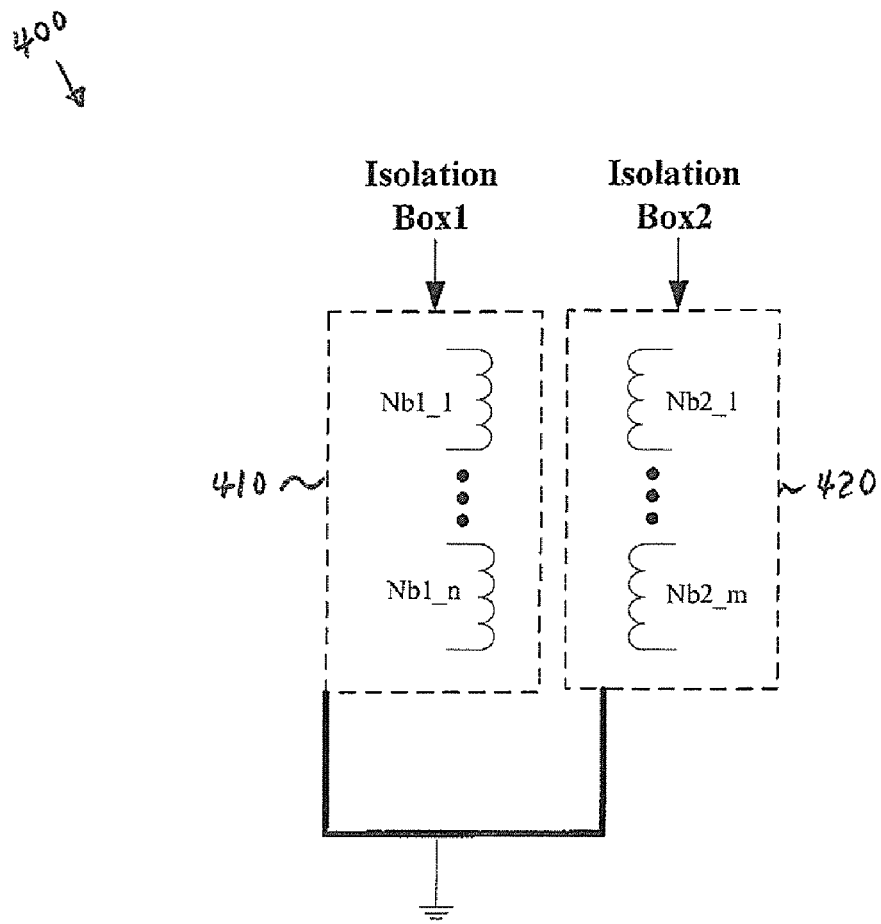
FIG. 4 is a simplified system for reducing electromagnetic interference according to another embodiment of the present invention.

FIG. 4 is a simplified system for reducing electromagnetic interference according to another embodiment of the present invention. This diagram is merely an example, which should not unduly limit the scope of the claims. One of ordinary skill in the art would recognize many variations, alternatives, and modifications. A system 400 includes at least two groups of windings. One of these two groups includes windings Nb1_1, ..., Nb1_n, where n is a positive integer, and this group is substantially or completely enclosed within an isolation box 410. The other one of the these two groups includes windings Nb2_1, ..., Nb2_m, where m is a positive integer, and this group is substantially or completely enclosed by an isolation box 420.

According to one embodiment, each of the isolation box 410 and the isolation box 420 includes one or more metal boards and/or one or more winding turns. For example, the one or more metal boards are one or more metal panels. In another example, the one or more metal boards and/or one or more winding turns for each isolation box are conductively connected to each other, directly or indirectly. In one embodiment, each of the isolation box 410 and the isolation box 420 is biased to a constant voltage level, such as a ground voltage level. In another embodiment, the one or more metal boards are made of copper, and/or the one or more winding turns are made of copper.

Figure 1:
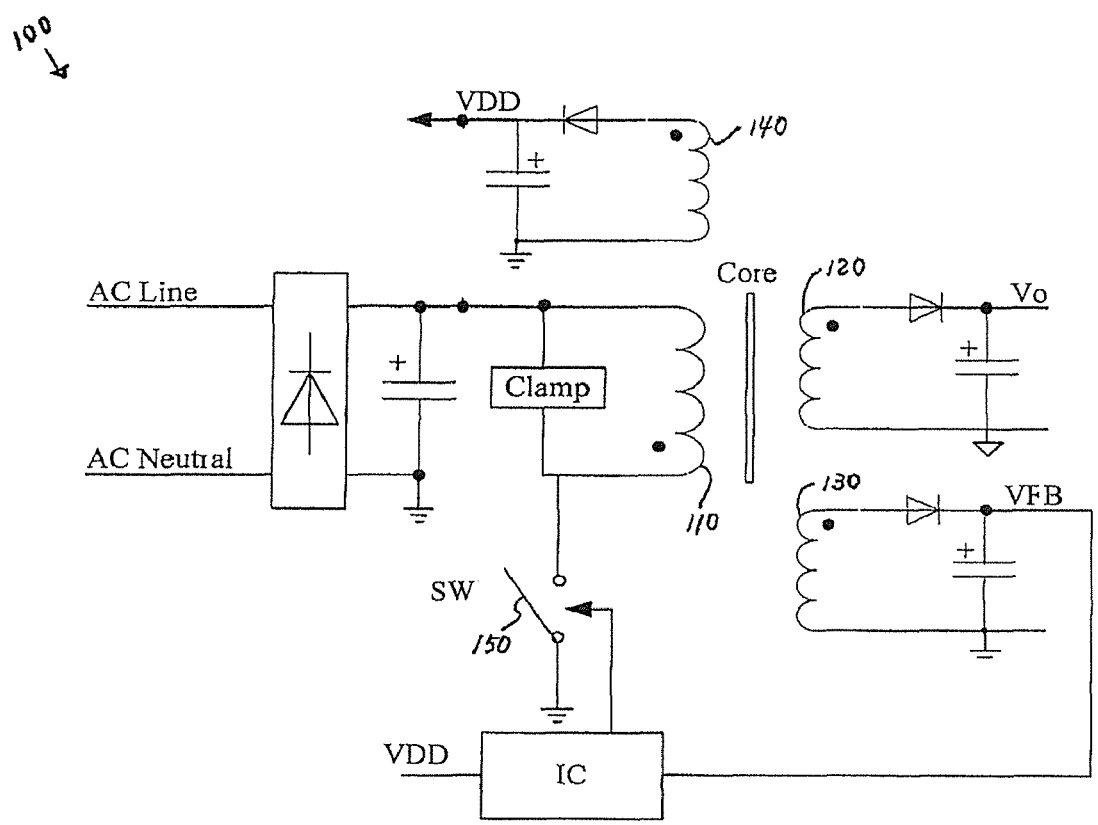
FIG. 1 is a simplified conventional flyback power converter system.

As discussed above and further emphasized here, FIGS. 3 and 4 are merely examples, which should not unduly limit the scope of the claims. One of ordinary skill in the art would recognize many variations, alternatives, and modifications. For example, each of the systems 300 and 400 includes certain conventional components and/or conventional connections, some or all of which can be found in FIG. 1 and/or FIG. 2.

Figure 5B:
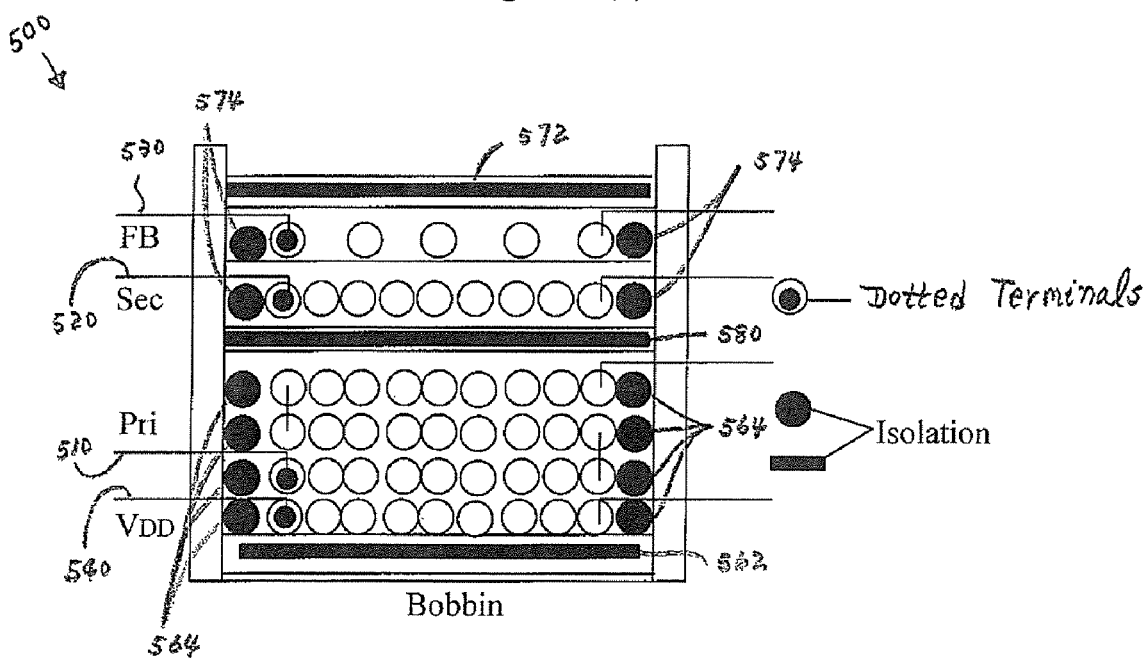

FIGS. 5(a) and (b) show a simplified flyback power converter system according to an embodiment of the present invention. Specifically, FIG. 5(b) illustrates a simplified cross section of this embodiment of the present invention.

These diagram are merely examples, which should not unduly limit the scope of the claims. One of ordinary skill in the art would recognize many variations, alternatives, and modifications. A flyback power converter system 500 includes an input winding 510, an output winding 520, a feedback sensing winding 530, an IC VDD supply winding 540, a switch 550, and two isolation boxes 560 and 570.

Although the above has been shown using a selected group of components for the system 500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

For example, the input winding 510, the output winding 520, the feedback sensing winding 530, the IC VDD supply winding 540, and the switch 550 are the same as the input winding 110, the output winding 120, the feedback sensing winding 130, the IC VDD supply winding 140, and the switch 150 respectively. Also, as shown in FIGS. 5(a) and (b), the input winding 510 and the IC VDD supply winding 540 are substantially or completely enclosed by the isolation box 560, and the output winding 520 and the feedback sensing winding 530 are substantially or completed enclosed by the isolation box 570.

According to one embodiment, the isolation box 560 includes metal boards 562 and 580 and winding turns 564, and the isolation box 570 includes metal boards 572 and 580 and winding turns 574. For example, the metal boards 562, 572, and 580 are metal panels. In another example, the metal boards 562 and 580 and the winding turns 564 are conductively connected to each other and biased to a constant voltage level, such as a ground voltage level. In yet another example, each of the metal boards 562 and 580 is made of copper, and each of the winding turns 564 is also made of copper.

According to another embodiment, the metal boards 572 and 580 and the winding turns 574 are conductively connected to each other and biased to a constant voltage level, such as a ground voltage level. In yet another example, each of the metal boards 572 and 580 is made of copper, and each of the winding turns 574 is also made of copper.

Figure 2:
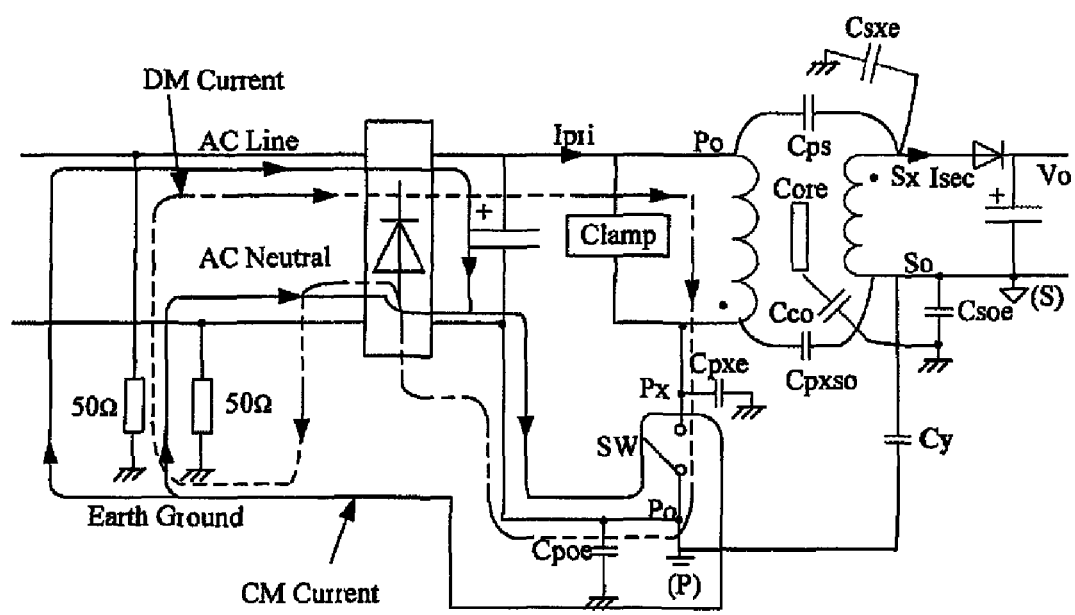
FIG. 2 shows simplified conventional parasitic capacitors that exist between an input winding and an output winding, and between a transformer core and an electrical earth.

As shown in FIGS. 5(a) and (b), the isolation boxes 560 and 570 share the same metal slab 580 according to one embodiment. In another embodiment, the system 500 does not include any Y-capacitor, such as one similar to the Y-capacitor Cy as shown in FIG. 2. For example, the system 500 is a no-Y primary-side sensing and regulation flyback power converter system.

Figure 6B:
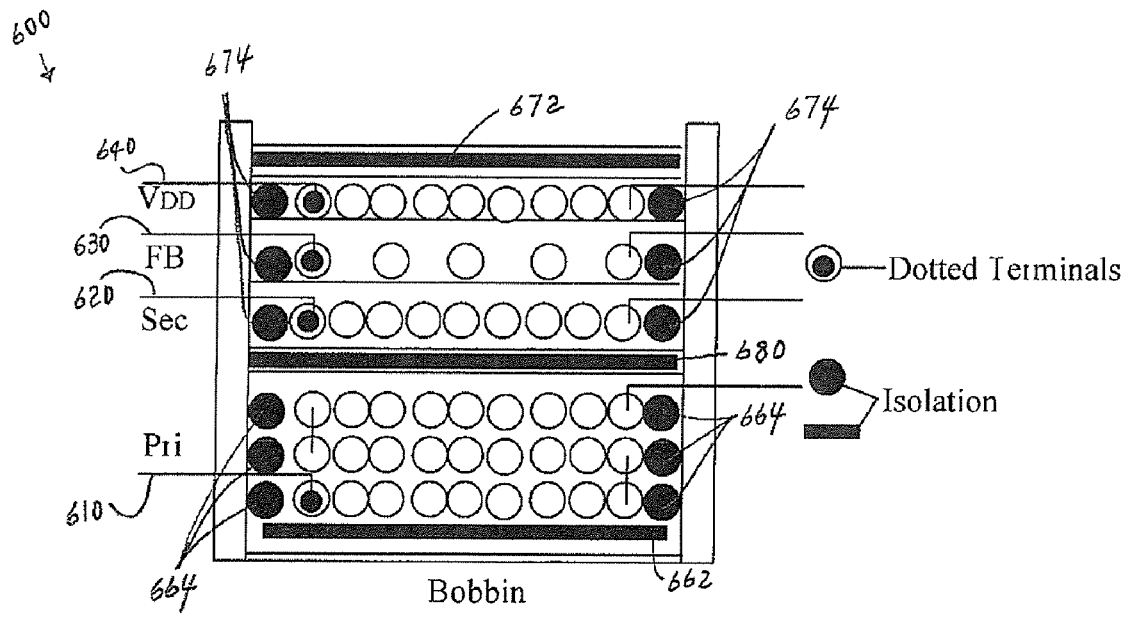

FIGS. 6(*a*) and (*b*) show a simplified flyback power converter system according to another embodiment of the present invention. Specifically, FIG. 6(*b*) illustrates a simplified cross section of this embodiment of the present invention.

These diagram are merely examples, which should not unduly limit the scope of the claims. One of ordinary skill in the art would recognize many variations, alternatives, and modifications. A flyback power converter system 600 includes an input winding 610, an output winding 620, a feedback sensing winding 630, an IC VDD supply winding 640, a switch 650, and two isolation boxes 660 and 670.

Although the above has been shown using a selected group of components for the system 600, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

For example, the input winding 610, the output winding 620, the feedback sensing winding 630, the IC VDD supply winding 640, and the switch 650 are the same as the input winding 110, the output winding 120, the feedback sensing winding 130, the IC VDD supply winding 140, and the switch 150 respectively. In another example, the feedback sensing winding 630 and the IC VDD supply winding 640 are two windings. In yet another example, the feedback sensing winding 630 and the IC VDD supply winding 640 are one same winding.

Also, as shown in FIGS. 6(*a*) and (*b*), the input winding 610 is substantially or completely enclosed by the isolation box 660, and the output winding 620, the feedback sensing winding 630, and the IC VDD supply winding 640 are substantially or completed enclosed by the isolation box 670.

According to one embodiment, the isolation box 660 includes metal boards 662 and 680 and winding turns 664, and the isolation box 670 includes metal boards 672 and 680 and winding turns 674. For example, the metal boards 662, 672, and 680 are metal panels. In another example, the metal boards 662 and 680 and the winding turns 664 are conductively connected to each other and biased to a constant voltage level, such as a ground voltage level. In yet another example, each of the metal boards 662 and 680 is made of copper, and each of the winding turns 664 is also made of copper.

According to another embodiment, the metal boards 672 and 680 and the winding turns 674 are conductively connected to each other and biased to a constant voltage level, such as a ground voltage level. In yet another example, each of the metal boards 672 and 680 is made of copper, and each of the winding turns 674 is also made of copper.

As shown in FIGS. 6(*a*) and (*b*), the isolation boxes 660 and 670 share the same metal slab 680 according to one embodiment. In another embodiment, the system 600 does not include any Y-capacitor, such as one similar to the Y-capacitor Cy as shown in FIG. 2. For example, the system 600 is a no-Y primary-side sensing and regulation flyback power converter system.

Figure 7B:
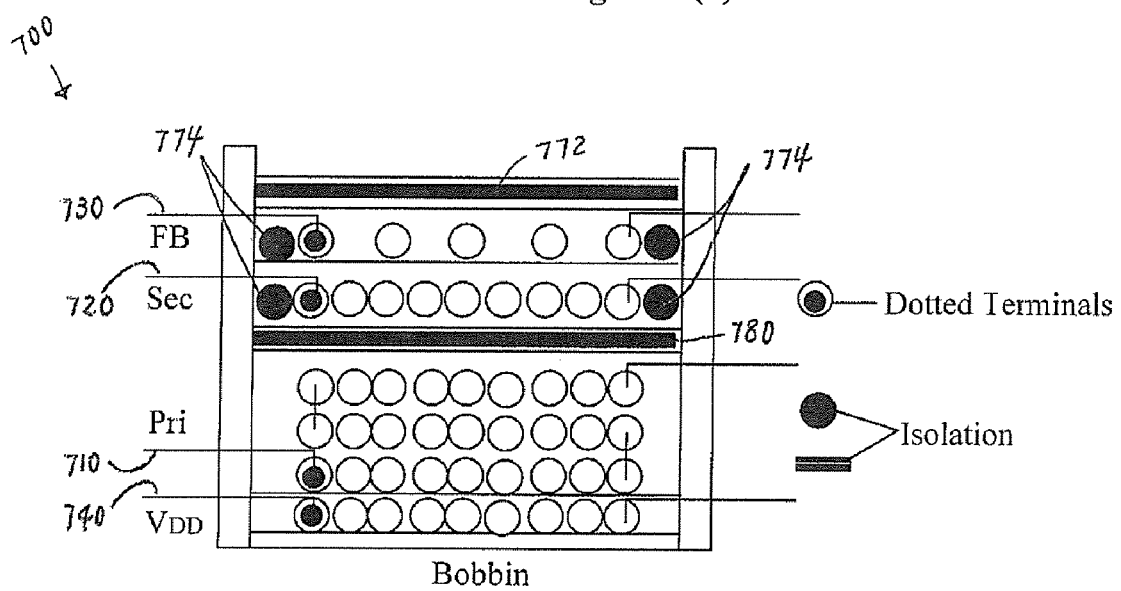

FIGS. 7(*a*) and (*b*) show a simplified flyback power converter system according to yet another embodiment of the present invention. Specifically, FIG. 7(*b*) illustrates a simplified cross section of this embodiment of the present invention.

These diagram are merely examples, which should not unduly limit the scope of the claims. One of ordinary skill in the art would recognize many variations, alternatives, and modifications. A flyback power converter system 700 includes an input winding 710, an output winding 720, a feedback sensing winding 730, an IC VDD supply winding 740, a switch 750, and an isolation box 770.

Although the above has been shown using a selected group of components for the system 700, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

For example, the input winding 710, the output winding 720, the feedback sensing winding 730, the IC VDD supply winding 740, and the switch 750 are the same as the input winding 110, the output winding 120, the feedback sensing winding 130, the IC VDD supply winding 140, and the switch 150 respectively. Also, as shown in FIGS. 7(*a*) and (*b*), the output winding 720 and the feedback sensing winding 730 are substantially or completed enclosed by the isolation box 770. Additionally, for example, neither the input winding 710 nor the IC VDD supply winding 740 is substantially or completely enclosed by any isolation box, such as any isolation box similar to the isolation box 770.

According to one embodiment, the isolation box 770 includes metal boards 772 and 780 and winding turns 774. For example, the metal boards 772 and 780 are metal panels. In another example, the metal boards 772 and 780 and the winding turns 774 are conductively connected to each other and biased to a constant voltage level, such as a ground voltage level. In yet another example, each of the metal boards 772 and 780 is made of copper, and each of the winding turns 774 is also made of copper.

As shown in FIGS. 7(*a*) and (*b*), the system 700 does not include any Y-capacitor, such as one similar to the Y-capacitor Cy as shown in FIG. 2. For example, the system 700 is a no-Y primary-side sensing and regulation flyback power converter system.

Figure 8B:
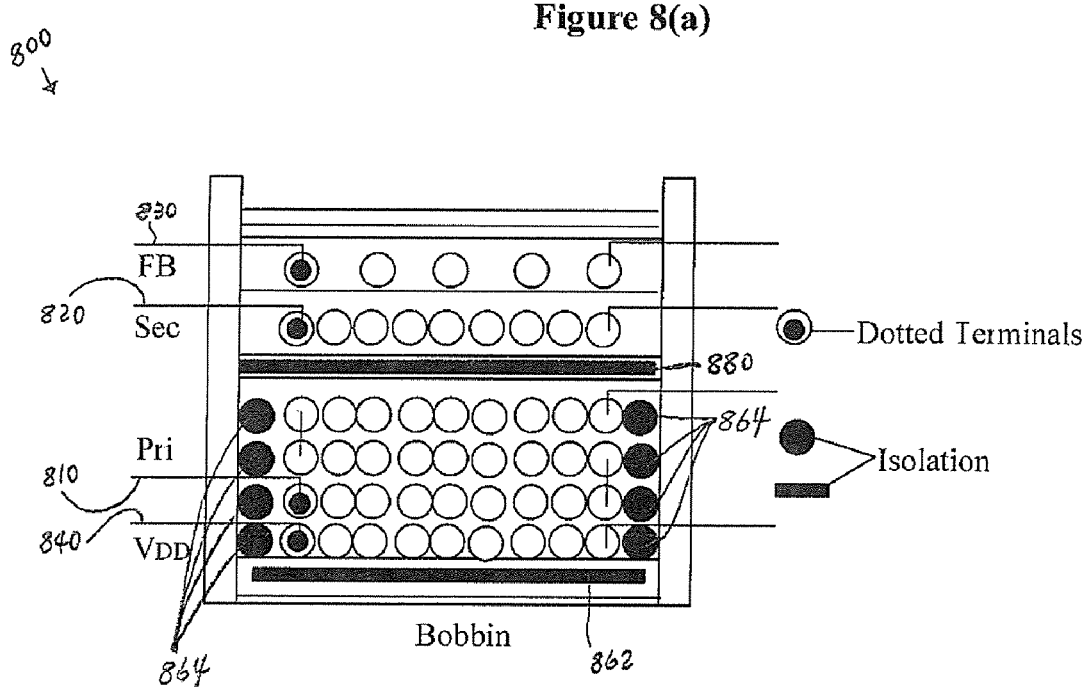

FIGS. 8(*a*) and (*b*) show a simplified flyback power converter system according to yet another embodiment of the present invention. Specifically, FIG. 8(*b*) illustrates a simplified cross section of this embodiment of the present invention.

These diagram are merely examples, which should not unduly limit the scope of the claims. One of ordinary skill in the art would recognize many variations, alternatives, and modifications. A flyback power converter system 800 includes an input winding 810, an output winding 820, a feedback sensing winding 830, an IC VDD supply winding 840, a switch 850, and an isolation box 860.

Although the above has been shown using a selected group of components for the system 800, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

For example, the input winding 810, the output winding 820, the feedback sensing winding 830, the IC VDD supply winding 840, and the switch 850 are the same as the input winding 110, the output winding 120, the feedback sensing winding 130, the IC VDD supply winding 140, and the switch 150 respectively. Also, as shown in FIGS. 8(*a*) and (*b*), the input winding 810 and the IC VDD supply winding 840 are substantially or completely enclosed by the isolation box 860.

Additionally, for example, neither the output winding 820 nor the feedback sensing winding 830 is substantially or completed enclosed by any isolation box, such as any isolation box similar to the isolation box 860. According to one embodiment, the isolation box 860 includes metal boards 862 and 880 and winding turns 864. For example, the metal boards 862 and 880 are metal panels. In another example, the metal boards 862 and 880 and the winding turns 864 are conductively connected to each other and biased to a constant voltage level, such as a ground voltage level. In yet another example, each of the metal boards 862 and 880 is made of copper, and each of the winding turns 864 is also made of copper.

As shown in FIGS. 8(*a*) and (*b*), the system 800 does not include any Y-capacitor, such as one similar to the Y-capacitor Cy as shown in FIG. 2. For example, the system 800 is a no-Y primary-side sensing and regulation flyback power converter system.

According to yet another embodiment, a system for switching mode power supply with multiple windings includes one or more first windings enclosed in a first isolation box, and one or more second windings enclosed in a second isolation box or not enclosed in any isolation box. For example, the first isolation box includes a plurality of winding turns and/or a copper shield. In another example, the first isolation box includes the plurality of winding turns but not any copper shield, or includes the copper shield but not any winding turns. In yet another example, the first isolation box is at least partially enclosed. In yet another example, the first isolation box is connected to an electrical earth or a fixed voltage source.

According to yet another embodiment, a system for switching mode power supply with multiple windings includes one or more first windings enclosed in a first isolation box and one or more second windings enclosed in a second isolation box. The first isolation box includes a first plurality of winding turns and/or a first copper shield, and the second isolation box includes a second plurality of winding turns and/or a second copper shield. For example, the system further includes one or more third windings enclosed in at least a third isolation box.

According to yet another embodiment, a system for forward converter includes one or more first windings enclosed in a first isolation box, and one or more second windings enclosed in a second isolation box. The first isolation box includes a first plurality of winding turns and/or a first copper shield, and the second isolation box includes a second plurality of winding turns and/or a second copper shield.

As discussed above and further emphasized here, FIGS. 5(*a*) and (*b*), 6(*a*) and (*b*), 7(*a*) and (*b*), and 8(*a*) and (*b*) are merely examples, which should not unduly limit the scope of the claims. One of ordinary skill in the art would recognize many variations, alternatives, and modifications. For example, each of the systems 500, 600, 700, and 800 can be a forward power converter system. In another example, each of the systems 500, 600, 700, and 800 can be a switch mode power converter system, such as one that performs AC to DC conversion. In yet another example, each of the systems 500, 600, 700, and 800 includes certain conventional components and/or conventional connections, some or all of which can be found in FIG. 1 and/or FIG. 2.

In yet another example, an input winding is also called an input primary winding, an output winding is also called an output secondary winding, a feedback sensing winding is also called a feedback winding, and an IC VDD supply winding is also called a voltage supply winding.

The present invention provides many advantages. Certain embodiments of the present invention provide techniques for reducing EMI in low-power switch mode power supplies. For example, a technique is provided to reduce EMI that is generated by an energy transfer element, such as a transformer, which is used in a No-Y flyback switch mode power converter system. In another example, a technique is provided to reduce EMI that is generated by an energy transfer element, which is used in a forward power converter system. Some embodiments of the present invention use one or more isolation boxes to reduce EMI in various applications, such as low-power applications.

According to certain embodiments, a switch mode power converter system, such as the system 300 as shown in FIGS. 3(*a*) and (*b*), uses one or more isolation boxes. The one or more isolation boxes can reduce or minimize the coupling of parasitic capacitors that significantly affects EMI. Additionally, the one or more isolation boxes can reduce or prevent the EMI emission by enclosing noisy devices in the one or more isolation boxes. For example, the one or more isolation boxes are tied to the electrical earth. In another example, noisy and coupling windings that contribute significantly to the displacement current and the EMI emission can be separated by using the one or more isolation boxes. According to some embodiments, a switch mode power converter system, such as the system 400 as shown in FIGS. 4(*a*) and (*b*), uses two or more isolation boxes so that EMI can be reduced to an even lower level than a system using only one isolation box.

According to yet another embodiment, a switch mode power converter system includes one or more isolation boxes including at least a first isolation box, an input primary winding for receiving an input signal for the switch mode power converter system, and an output secondary winding for generating an output signal for the switch mode power converter system. The switch mode power converter system is configured to convert the input signal to the output signal. One of the input primary winding and the output secondary winding is substantially enclosed in the first isolation box, and the other of the input primary winding and the output secondary winding is not enclosed in the first isolation box. The first isolation box is conductively connected to a constant-voltage source. For example, the system is implemented according to at least FIG. 3, FIG. 4, FIGS. 5(*a*) and (*b*), FIGS. 6(*a*) and (*b*), FIGS. 7(*a*) and (*b*), and/or FIGS. 8(*a*) and (*b*).

In another example, the first isolation box includes at least one conductive winding with one or more turns. In yet another example, the first isolation box further includes one or more conductive boards. In yet another example, the one of the input primary winding and the output secondary winding is completely enclosed in the first isolation box. In yet another example, a switch connected to the input primary winding and the constant-voltage source. In yet another example, the constant-voltage source is the electric ground. In yet another example, the one or more isolation boxes further include a second isolation box, and the other of the input primary winding and the output secondary winding is substantially enclosed in the second isolation box. In yet another example, the other of the input primary winding and the output secondary winding is completely enclosed in the second isolation box.

According to yet another embodiment, a switch mode power converter system includes a first isolation box, a second isolation box, an input primary winding for receiving an input signal for the switch mode power converter system, and an output secondary winding for generating an output signal for the switch mode power converter system. Additionally, the system includes a feedback winding for generating a feedback signal, and a voltage supply winding for generating a voltage. The switch mode power converter system is configured to convert the input signal to the output signal. At least the input primary winding is substantially enclosed in the first isolation box, and at least the output secondary winding and the feedback winding are substantially enclosed in the second isolation box. The first isolation box and the second isolation box are conductively connected to a constant-voltage source. For example, the system is implemented according to at least FIGS. 5(a) and (b), and/or FIGS. 6(a) and (b).

In another example, the voltage supply winding is substantially enclosed in the first isolation box. In yet another example, the voltage supply winding is substantially enclosed in the second isolation box. In yet another example, each of the first isolation box and the second isolation box includes at least one conductive winding with one or more turns. In yet another example, each of the first isolation box and the second isolation box further includes one or more conductive boards.

In yet another example, at least the input primary winding is completely enclosed in the first isolation box, and at least the output secondary winding and the feedback winding are completely enclosed in the second isolation box. In yet another example, the system further includes a switch connected to the input primary winding and the constant-voltage source, and the switch is configured to receive a control signal generated based on at least information associated with the feedback signal.

According to yet another embodiment, a switch mode power converter system includes an isolation box, and a first plurality of windings including an input primary winding and a voltage supply winding. The input primary winding is for receiving an input signal for the switch mode power converter system, and the voltage supply winding is for generating a voltage. Additionally, the system includes a second plurality of windings including an output secondary winding and a feedback winding. The output secondary winding is for generating an output signal for the switch mode power converter system, and the feedback winding is for generating a feedback signal. The switch mode power converter system is configured to convert the input signal to the output signal. One plurality of the first plurality of windings and the second plurality of windings is substantially enclosed in the first isolation box, and the other plurality of the first plurality of windings and the second plurality of windings is not enclosed in the first isolation box. The first isolation box is conductively connected to a constant-voltage source. For example, the system is implemented according to at least FIGS. 7(a) and (b), and/or FIGS. 8(a) and (b).

In another example, the input primary winding and the voltage supply winding are substantially enclosed in the first isolation box, and the output secondary winding and the feedback winding are not enclosed in any isolation box. In yet another example, the input primary winding and the voltage supply winding are completely enclosed in the first isolation box.

In yet another example, the output secondary winding and the feedback winding are substantially enclosed in the first isolation box, and the input primary winding and the voltage supply winding are not enclosed in any isolation box. In yet another example, the output secondary winding and the feedback winding are completely enclosed in the first isolation box.

In yet another example, the first isolation box includes at least one conductive winding with one or more turns. In yet another example, the first isolation box further includes one or more conductive boards. In yet another example, the system further includes a switch connected to the input primary winding and the constant-voltage source, and the switch is configured to receive a control signal generated based on at least information associated with the feedback signal.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A switch-mode power conversion system, the system comprising:
   a first plurality of transformer windings including a second plurality of transformer windings and a third plurality of transformer windings; and
   a first isolation box including one or more first metal boards and one or more first isolation winding turns, the one or more first metal boards being conductively connected to the one or more first isolation winding turns, the one or more first isolation winding turns being not part of any of the first plurality of transformer windings;
   wherein:
   the second plurality of transformer windings is not enclosed in the first isolation box;
   the third plurality of transformer windings is substantially enclosed in the first isolation box; and
   the first isolation box is biased to a first constant voltage.

2. The system of claim 1, and further comprising:
   a second isolation box including one or more second metal boards and one or more second isolation winding turns, the one or more second metal boards being conductively connected to the one or more second isolation winding turns, the one or more second isolation winding turns being not part of any of the first plurality of transformer windings;
   wherein:
   the second plurality of transformer windings is substantially enclosed in the second isolation box;
   the third plurality of transformer windings is not enclosed in the second isolation box; and
   the second isolation box is biased to a second constant voltage.

3. The system of claim 2 wherein one of the one or more first metal boards is one of the one or more second metal boards.

4. The system of claim 2 wherein the first constant voltage is electric ground.

5. The system of claim 4 wherein the second constant voltage is the electric ground.

6. The system of claim 1 wherein the second plurality of transformer windings includes an input primary winding for receiving an input signal for the switch mode power conversion system.

7. The system of claim 6 wherein the second plurality of transformer windings further includes a voltage supply winding for generating a voltage.

8. The system of claim 1 wherein the third plurality of transformer windings includes an output secondary winding for generating an output signal for the switch mode power conversion system and a feedback winding for generating a feedback signal.

9. The system of claim 1 wherein the second plurality of transformer windings includes an output secondary winding for generating an output signal for the switch mode power conversion system and a feedback winding for generating a feedback signal.

10. The system of claim 1 wherein the third plurality of transformer windings includes an input primary winding for receiving an input signal for the switch mode power conversion system.

11. The system of claim 10 wherein the third plurality of transformer windings further includes a voltage supply winding for generating a voltage.

12. A switch-mode power conversion system, the system comprising:
 an isolation box; and
 a first plurality of transformer windings including:
  a second plurality of transformer windings including an input primary winding for receiving an input signal for the switch mode power conversion system and a voltage supply winding for generating a voltage; and
  a third plurality of transformer windings including an output secondary winding for generating an output signal for the switch mode power conversion system and a feedback winding for generating a feedback signal;
 wherein:
  the switch mode power conversion system is configured to convert the input signal to the output signal;
  the isolation box includes:
   one or more metal boards; and
   one or more isolation winding turns;
   wherein:
    the one or more metal boards are conductively connected to the one or more isolation winding turns; and
    the one or more isolation winding turns are not part of any of the first plurality of transformer windings;
  one of the second plurality of windings and the third plurality of windings is enclosed in the isolation box;
  the other one of the second plurality of windings and the third plurality of windings is not enclosed in the isolation box; and
  the isolation box is biased to a first constant voltage.

13. The system of claim 12 wherein:
 the second plurality of windings is enclosed in the isolation box; and
 the third plurality of windings is not enclosed in the isolation box.

14. The system of claim 12 wherein:
 the third plurality of windings is enclosed in the isolation box; and
 the second plurality of windings is not enclosed in the isolation box.

15. The system of claim 12 wherein the first constant voltage is electric ground.

16. The system of claim 15, and further comprising a switch connected to the input primary winding and biased to a second constant voltage.

17. The system of claim 16 wherein the second constant voltage is the electric ground.

18. The system of claim 16 wherein the switch is configured to receive a control signal generated based on at least information associated with the feedback signal.

* * * * *